United States Patent [19]

Green

[11] Patent Number: 5,639,207

[45] Date of Patent: Jun. 17, 1997

[54] MODULAR UNIT LOADING AND UNLOADING METHOD

[76] Inventor: Richard Green, P.O. Box 249, Titus, Ala. 36080

[21] Appl. No.: 702,748

[22] Filed: Aug. 23, 1996

Related U.S. Application Data

[62] Division of Ser. No. 273,792, Jul. 12, 1994, Pat. No. 5,562,391.

[51] Int. Cl.[6] .................................................. B60P 1/43
[52] U.S. Cl. ........................ 414/786; 414/500; 414/494
[58] Field of Search ................................. 414/542, 498, 414/499, 500, 494, 482, 477, 478, 491, 492, 493, 560, 537, 538, 539, 571, 786; 298/12, 14

[56] References Cited

U.S. PATENT DOCUMENTS

| | | | |
|---|---|---|---|
| 1,382,328 | 6/1921 | Stone | 414/499 X |
| 2,135,857 | 11/1938 | Stahl | 414/494 |
| 3,077,278 | 2/1963 | Alexander | 414/494 |
| 3,341,038 | 9/1967 | Wicklund | 414/542 |
| 5,388,949 | 2/1995 | Berg | 414/494 X |
| 5,405,233 | 4/1995 | Cordell | 414/494 X |

FOREIGN PATENT DOCUMENTS

| | | | |
|---|---|---|---|
| 2686843 | 8/1993 | France | 414/494 |
| 2514881 | 10/1976 | Germany | 414/494 |

*Primary Examiner*—Frank E. Werner
*Attorney, Agent, or Firm*—Brinks Hofer Gilson & Lione

[57] ABSTRACT

A transport apparatus and method that can load and unload load carrying containers directly to and from the ground, to and from specially designed receivers or from and to portable support stands. The transport apparatus includes a tiltable trailer having longitudinal guide rails or surfaces that receive anti-friction devices of the load carrying containers. The tiltable trailer can be carried by a ground wheel support chassis and can be pivoted between a substantially horizontal travelling position and a backwardly-downwardly inclined position at which the rear portions of its longitudinal guide surfaces have been displaced toward the ground to a position above the ground where they can engage the anti-friction devices of a ground supported load carrying container.

8 Claims, 5 Drawing Sheets

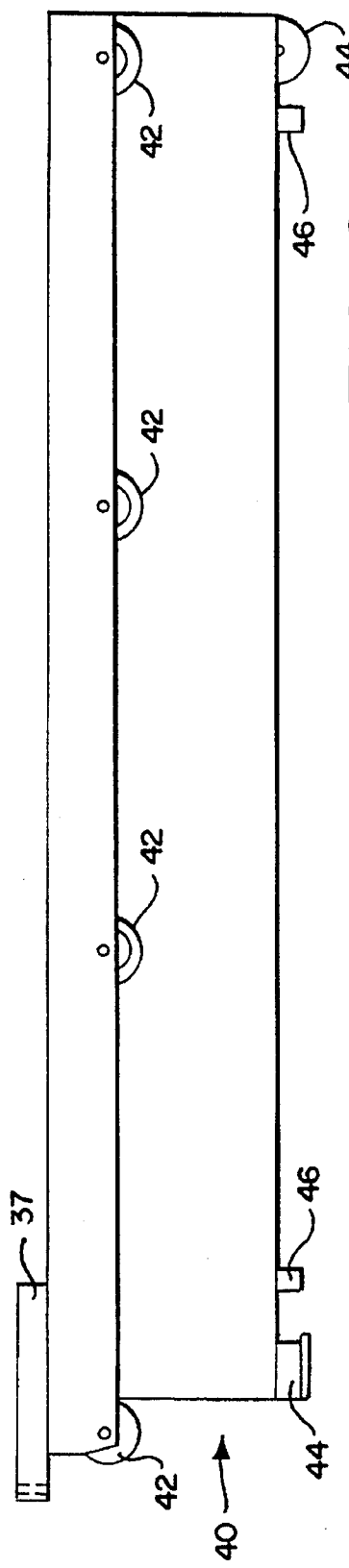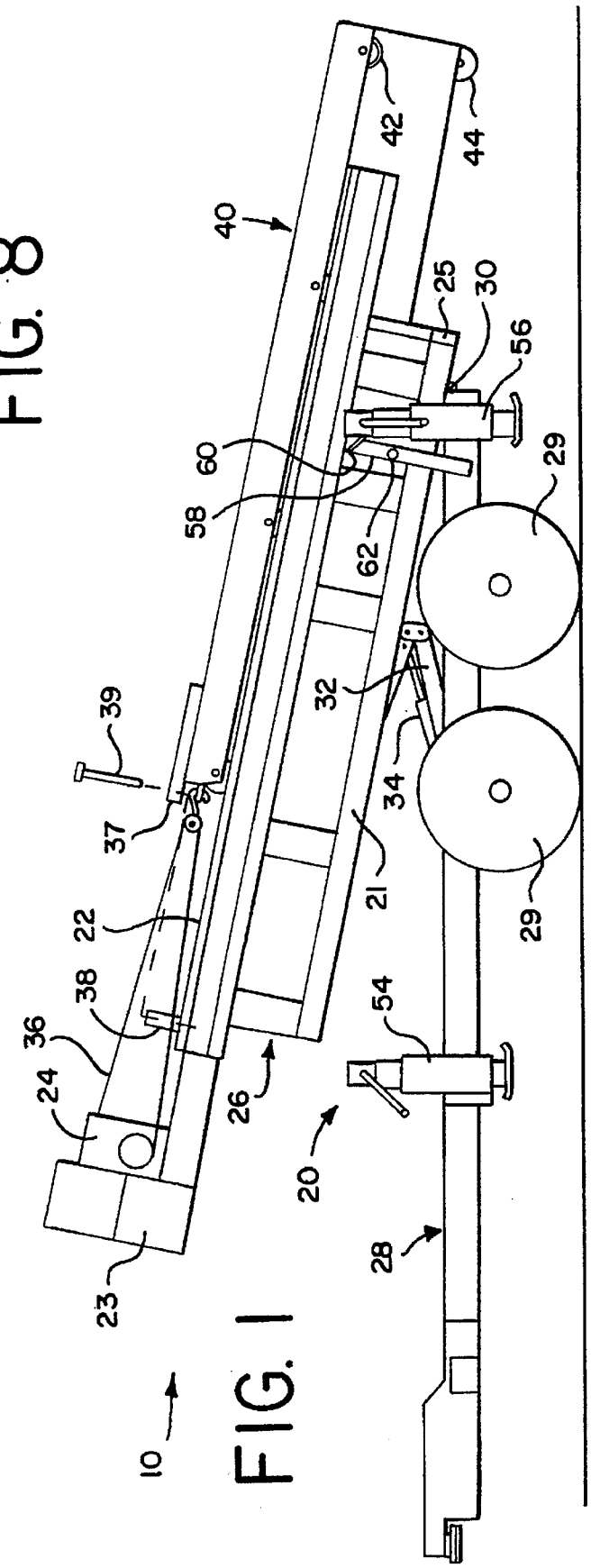

MODULAR UNIT LOADING AND UNLOADING METHOD

This application is a division of application Ser. No. 08/271,792, filed Jul. 12, 1994 now U.S. Pat. No. 5,562,391.

CROSS-REFERENCES

The present application is related to my application Ser. No. 08/001,960, filed Jan. 1, 1993, entitled "now U.S. Pat. No. 5,496,753 Roll on Roll Off Device". This application is also related to application Ser. No. 08/200,958 filed on Feb. 24, 1994, entitled "ROLL ON ROLL OFF DEVICE WITH A PORTABLE SUPPORT", now U.S. Pat. No. 5,593,272. Both of these applications are incorporated herein by this reference.

BACKGROUND OF THE INVENTION

This invention relates to a transport apparatus for vehicles that can load and unload modular containers or units directly from and to the ground (fully ground bearing). Although the embodiment disclosed in this application has the fully ground bearing capability it has the versatility to load and unload modular containers or units from fixed or permanent receivers designed for this purpose or to load and unload to and from transportable support devices, such as is more completely disclosed in the above referred to co-pending applications Ser. No. 08/001,960 and 08/200,958.

The modular container or unit to be transported can have various shapes and perform various functions. For example, it can be in the form of a specialized container such as a food or drink package, a fire wood container or a container for industrial parts. Other forms that the modular units could be are boat trailers, portable offices, fuel tanks, water tanks, cranes or an animal shelter. The transport apparatus could be a self propelled vehicle such as a vehicle designed specifically for this purpose or a trailer that is towed for example by a pick-up truck. The transport apparatus could also be a towed trailer that has a self propelled winch mounted thereon. When the transport apparatus of this application is used the modular container or units can be supported directly on the ground or pavement and thus specially designed stands or receivers for supporting the modular container or unit prior to loading and for unloading to are not required. This is especially advantageous in unloading the modular container or unit, and retrieving empty modular container or units since the point of delivery is often a remote site that does not have compatible specialized equipment.

U.S. Pat. No. 4,930,799, entitled TILTABLE TRAILER FOR MOTOR VEHICLES, ESPECIALLY PASSENGER CARS discloses an apparatus including a chassis made up of a front frame element and a rear element that is tiltable relative to the front element. A winch is mounted on the front frame element and includes a wire that extends rearwardly to a basic frame which is a common part of a plurality of add-on units. The wire from the winch extends over the free end of a pivotable arm that is connected to the rear end of the frame element, such that the front end of the basic frame is elevated prior to be being pulled forward. When the basic frame is pulled forward it causes the pivotable arm to fold down. There is a stop at the forward end of the frame element to stop forward movement of the basic frame and locking means, at the rear end of frame element for automatically securing the basic frame to the frame element. A lever is disclosed that is connected to the basic frame that causes the basic frame to move a distance from the frame element when the two are separated.

The invention in prior art U.S. Pat. No. 4,930,799 is in the special pivotable arm and lever that enable the apparatus to pick up and deliver the basic frame to and from the ground. Although the special arms and levers of the type that are disclosed in this prior art reference permit pick up from and delivery to the ground they add expense, weight and complexity to the device. Furthermore, the special pivotable arm and lever limits the versatility of the basic frame since they would interfere if the basic frame were to be used with special designed receivers or with portable support stands. However, a production model of the trailer disclosed in U.S. Pat. No. 4,930,799 could be retrofited to include the invention of this application. Furthermore, other commercially available dump type trailers could be easily and inexpensively retrofited to use the invention of this application.

For the foregoing reasons, there is a need for a fully ground bearing apparatus for vehicles that can load and unload a modular container or unit from and to the ground, from and to special designed receivers or from portable support stands.

SUMMARY OF THE INVENTION

The present invention is directed to a transport apparatus that satisfies the need for a transport apparatus that can load and unload fully ground bearing apparatus from and to the ground. The transport apparatus of this invention can also load and unload from and to specially designed receivers or from and to portable support stands.

The transport apparatus consists of a tiltable trailer and a load carrying structure that can be loaded to or unloaded from the tiltable trailer. The tiltable trailer has a ground wheel support chassis upon which is pivotally supported a tiltable frame that has longitudinal guide surfaces along each of its side portions. The longitudinal guide surfaces being elevated from the base of the tiltable frame a given distance. The tiltable frame can be pivoted between a substantially horizontal travelling position and a backwardly-downwardly inclined position at which the rear portions of its longitudinal guide surfaces have been displaced toward the ground to a location where they are spaced above the ground a distance that is less than said given distance. The load carrying structure has ground engaging supports and anti-friction devices that define surfaces that are substantially horizontal when said load carrying structure is supported on the ground. The surfaces defined by the anti-friction devices are spaced above the ground a distance less than said given distance when the load carrying structure is supported on the ground. The load carrying structure is supported on and can be displaced along the longitudinal guide surfaces of the tiltable frame element. A winch including a cable is carried by the ground-wheel supported chassis, with the free end of the cable being connectable to said load carrying structure for moving it along the tiltable frame element.

In the preferred embodiment an electrically controlled hydraulic mechanism is used to pivot the tiltable frame relative to the ground wheel support chassis and an electrically controlled winch is used to move the load carrying structure along the inclined tiltable frame element. Each of these electrically controlled systems are operated by remote controls. The remote controls have a range of about 50 feet which enables an operator to be a safe distance away from the transport apparatus when the modular units are being loaded or unloaded. The remote control further enables an operator to be at a location where an overview of the equipment and its surroundings is possible.

The tiltable trailer of this application, in addition to use as one of the components of the loading and unloading apparatus of this invention can be used alone as a dump trailer.

For the foregoing reasons there is a need for a tiltable trailer that can pick up a load and deliver a load directly from and to the ground or from and to specially designed receivers or from and to portable supports stands.

BRIEF DESCRIPTION OF THE DRAWINGS

FIG. 1 shows a side view of an embodiment of the invention with the tiltable frame element slightly elevated.

FIG. 8 is an enlarged isolated view of one embodiment of the load carrying structure.

DETAILED DESCRIPTION OF THE PREFERRED EMBODIMENT

Figure 2:
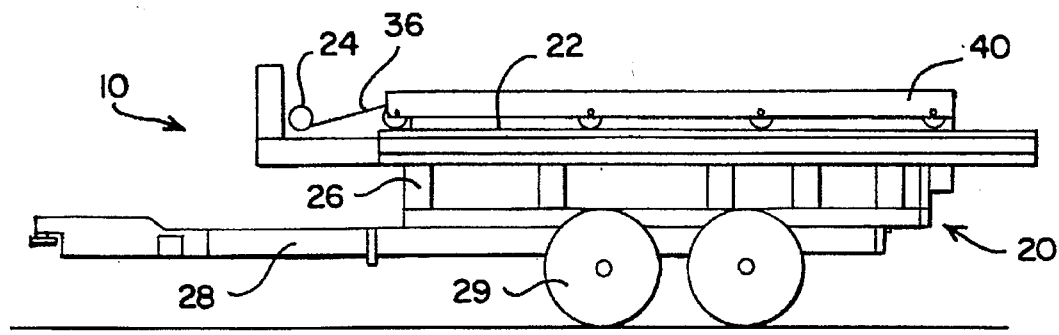
FIG. 2 is the first view in a series of side views of an embodiment of the transport apparatus.

There is shown in FIG. 1 a side view of the preferred embodiment of the transport apparatus 10. The transport apparatus 10 is made up of a tiltable trailer 20 and a load carrying structure 40. The tiltable trailer 20 includes a ground wheel support chassis 28 having ground engaging wheels 29 and a tiltable frame element 26. The tiltable frame element 26 has longitudinal guide surfaces 22 on each side thereof and a winch 24 and tool and accessory box 23 at its forward end. The longitudinal guide surfaces 22 are in the shape of tracks that function to retain the anti-friction devices. The tiltable frame element 26 is a weldment of tubular members and sheet material and thus provides a sturdy structure that can support substantial loads. The sides of the tiltable frame is constructed of longitudinal tubes, such as bottom longitudinal tube 21 which has a flat upper surface and vertical post 31. The tiltable frame element 26 is pivotally connected to the ground wheel support chassis 28 along a hinge axis 30. A pair of three link arrangements 32 are connected at their free ends to the tiltable frame element 26 and the ground wheel support chassis 28.

Hydraulic cylinders 34, anchored at their cylinder ends on the ground wheel support chassis 28 are connected at their rod ends to each of the hinges 32. It should be noted that there is a three link arrangement 32 and a hydraulic cylinder 34 on each side of the ground wheel support chassis 28. When the hydraulic cylinders 34 are expanded the tiltable frame element 26 is pivoted about hinge axis 30 toward its lowered or horizontal position and when contracted tiltable frame element 26 is pivoted about hinge axis 30 toward its raised or elevated position. Conventional hydraulic fluid pumps, storage batteries and control mechanisms are carried by the ground wheel support chassis 28 and function to control the flow of hydraulic fluid to and from the hydraulic cylinders 34. Conventional electronic controls are provided for actuating the control mechanisms for the hydraulic cylinders 34. The electronic controls can be located in the cab of a self propelled vehicle that is used to tow the transport apparatus 10 or hand held remote controls can be used. Conventional remote controls have a range of about 50 feet which enables an operator to control the tiltable frame element 26 from a safe distance and from a vantage point where the operator has an overview of the entire operating area.

The load carrying structure 40 has a set of anti-friction devices 42 on each side thereof and ground engaging supports 44 at the front and back thereof. The anti-friction devices 42 are dimension and located such that they ride in grooves formed in the longitudinal guide surfaces 22.

A winch 24, mounted at the forward end of tiltable frame element 26, functions to wind in and out a cable 36 that is connected to load carrying structure 40. When winch 24 is engaged the load carrying structure 40 moves longitudinally along the tiltable frame element 26. Control mechanisms or remote controls are provided for operating the winch 24. When remote controls are used an operator can control both the pivoting movement of tiltable frame element 26 and the winch operation from a safe location where an overview of the operating area is possible.

When the load carrying structure 40 is positioned in its full forward position member 37, that is secured to its forward portion, overlies a locking member 38 that is carried by the forward portion of tiltable frame element 26. The member 37 and the locking member 38 have apertures formed therein that become aligned when the load carrying structure 40 reaches its full forward position. Gravity pins 39 are inserted through the aligned apertures to lock the load carrying structure 40 in its full forward position on the tiltable frame element 26. With the gravity pins 39 in place the tiltable frame element 26 can be raised and the load carrying structure 40 will remain in its full forward position relative to the tiltable frame element 26. This arrangement could be used when it is desired to dump the load out of the rear of load carrying structure 40 rather than sperate the load carrying structure from the tiltable frame element 26. However the main function of gravity pins 39 is to function as a safety lock mechanism to insure that the load carrying structure 40 will not accidently roll off the tiltable trailer 20 during transport of the transport apparatus 10.

The ground wheel support chassis 28 has a pair of forward ground engaging jacks 54 and a pair rear ground engaging jacks 56 which can be lowered to anchor the ground wheel support chassis 28 in place. This relieves the springs and axles from the burden of supporting heavy loads during loading and unloading operation and can be of particular importance when heavy loads are being manipulated or the ground is not solid.

A manual support mechanism 58, is carried by ground wheel support chassis 28, that includes a stop 60 in the form of a plate that extends inwardly toward the side of tiltable frame element 26 and overlays the flat upper surface of longitudinal tube 21. Manual support mechanism 58 functions to support the tiltable frame element 26 in a raised position relative to the ground wheel support chassis 28. When the tiltable frame element 26 reaches its maximum inclined position the bottom surface of stop plate 60 engages the upper flat surface of longitudinal tube 21, thus providing a mechanical stop preventing further elevation of the tiltable frame element 26. At this time a lever type stop 62 can be manually repositioned such that it engages the bottom flat surface of longitudinal tube 21. Thus, stop provides a mechanical stop preventing the lowering of tiltable frame element 26. The stops 60 and 62, when functioning, also relieve stress on hydraulic cylinder 34. This is particularly important when a heavily loaded load carrying structure 40 is being pulled up the inclined tiltable frame element 26. Without the manual support mechanisms 58 the force of the load is transferred to hydraulic cylinder 34 which could be damaged. When the tiltable frame element 26 is raised to receive a load carrying structure 40, stop 60 is engaged to prevent inclination beyond the designed maximum and stop 62 is manually engaged to support the tiltable frame element 26 from downward movement. This provides a mechanical support to hold the tiltable frame element 26 in the inclined position and relieves the stresses from the hydraulic cylinder 34.

Figure 12:
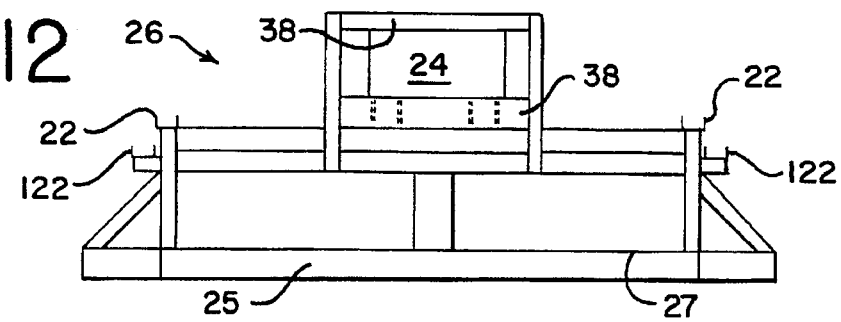
FIG. 12 is an isolated rear view of the tiltable frame element.

Referring now to FIG. 12 which is a rear view of the tiltable frame element 26. In this view the base 27 and it rear end portion 25 can be seen. The longitudinal guide surfaces 22 are elevated, a given distance, above the base 27. In this view a second set of longitudinal guide surfaces 122 are identified. Guide surfaces 122 are located at a level below guide surfaces 22.

Figure 13:
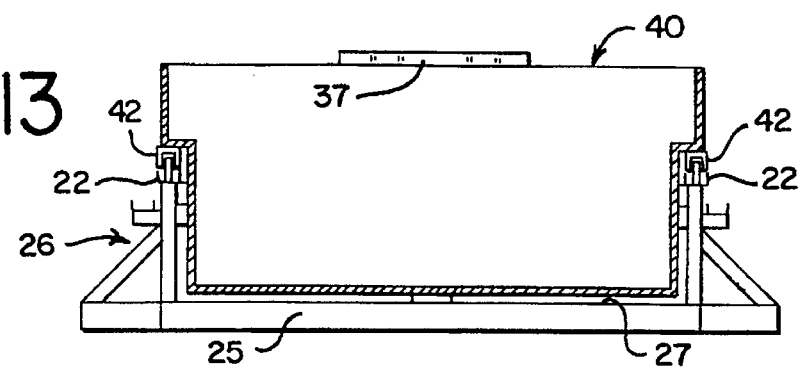
FIG. 13 is an isolated rear view of the tiltable frame element with one embodiment of the load carrying structure supported thereon.

In FIG. 13 the load carrying structure 40 has been added to the view of the tiltable frame element 26 seen in FIG. 12. It should be noted that the bottom surface of load carrying structure 40 does not contact the base 27 and the entire weight of the load carrying structure 40 is supported by the anti-friction devices 42 that ride in the longitudinal guide surfaces 22.

The roll on roll off feature of the transport apparatus 10 will now be discussed with reference to the series of drawings identified as FIGS. 2-7. It should be noted that because of the small scale of the these drawings some of the details, such as the hinge 32, that are seen in FIG. 1 are not included in these drawings.

In FIG. 2 the tiltable frame element 26 is in its horizontal or fully lowered position. This is the transport position and prior to transport the gravity pins 39 should be inserted to lock the load carrying structure 40 to the tiltable trailer 20.

When it is desired to roll the load carrying structure 40 off the tiltable trailer 20 at a delivery destination the gravity pins 39 are removed and the hydraulic cylinders 34 are contracted which causes the three link arrangement 32 to begin opening and the tiltable frame element 26 to begin pivoting up about hinge axis 30.

Figure 3:
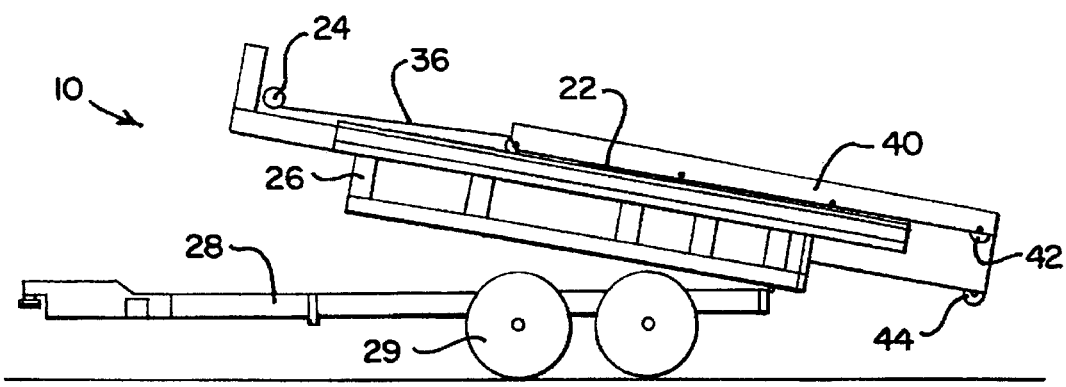
FIG. 3 is the second view in a series of side views of an embodiment of the transport apparatus.

The tiltable frame element 26 is shown in FIG. 3 at a position where it has been pivoted up about 10°. The load carrying structure 40 has, in FIG. 3, moved rearwardly from its home position shown in FIG. 2. The winch 24 is actuated to unwind cable 36 in the direction which permits the load carrying structure 40 to roll in response to gravity down the longitudinal guide surfaces 22 of the tiltable frame element 26.

Figure 4:
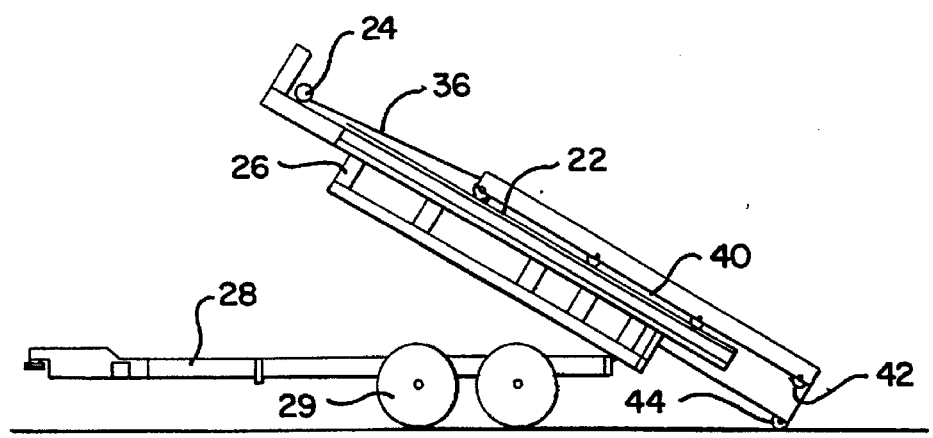
FIG. 4 is the third view in a series of side views of an embodiment of the transport apparatus.

As seen in FIG. 4 the elevation of tiltable frame element 26 has been increased to about 30° and the load carrying structure 40 has rolled down the longitudinal guide surfaces 22 to the point where the rear ground engaging supports 44 make initial contact with the ground.

Figure 5:
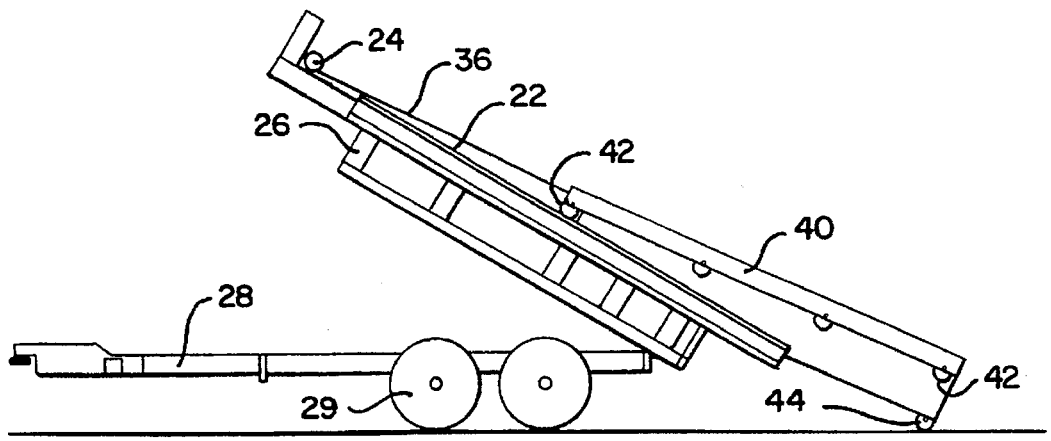
FIG. 5 is the fourth view in a series of side views of an embodiment of the transport apparatus.

In FIG. 5 the tiltable frame element 26 remains at about a 30° elevation and the load carrying structure 40 has rolled further down the longitudinal guide surfaces 22. The rear ground engaging supports 44, which are in the form of rollers or wheels, permit the bottom rear corner of the load carrying structure 40 to roll rearwardly relative to the transport apparatus 10. It should be noted that in FIG. 5 only the forward most anti-friction devices 42 remain in engagement with the longitudinal guide surfaces 22 which minimizes the frictional resistance between the anti-friction devices 42 and the longitudinal guide surfaces 22. If the friction between the rear ground engaging supports 44 and the ground is to great to permit gravity to roll the-road carrying structure 40 back the transport apparatus 10 can be driven or pulled forward.

Figure 6:
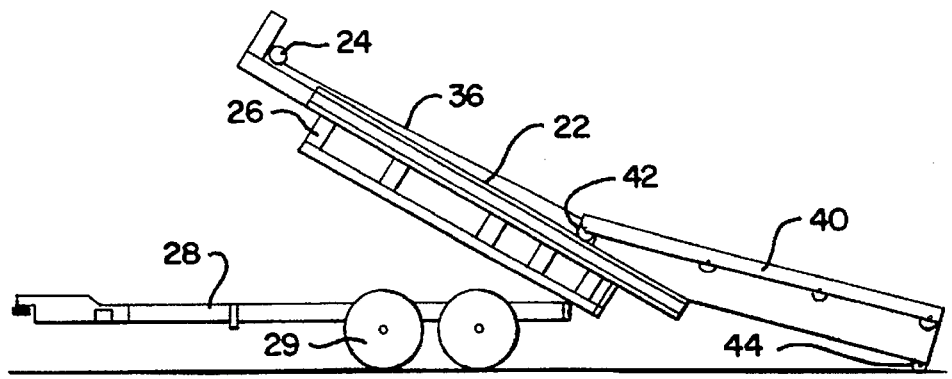
FIG. 6 is the fifth view in a series of side views of an embodiment of the transport apparatus.

As seen in FIG. 6 the tiltable frame element 26 remains at an elevation of about 30° and the load carrying structure 40 has rolled further down the longitudinal guide surfaces 22 and further to the rear of transport apparatus 10.

Figure 7:
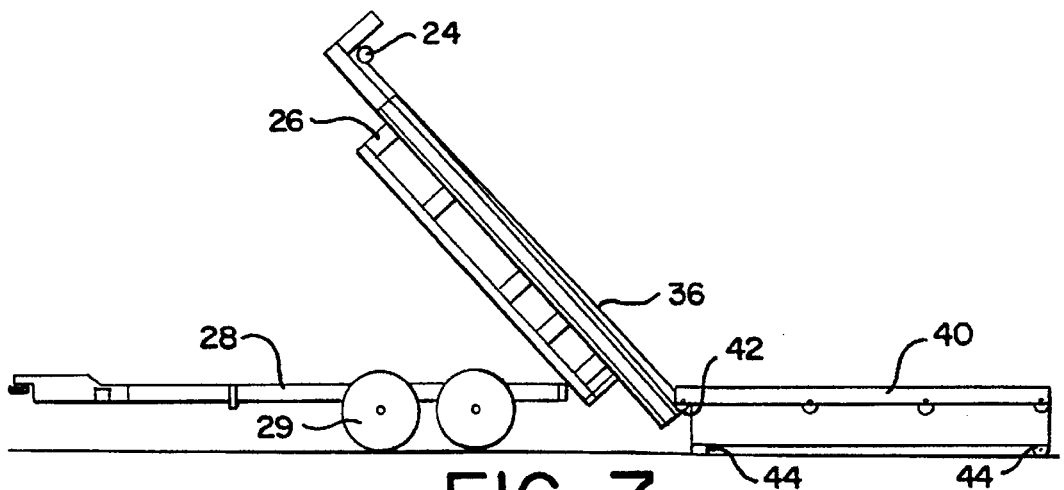
FIG. 7 is the sixth and final view in a series of side views of an embodiment of the transport apparatus.

In FIG. 7 the tiltable frame element 26 has been elevated to about 40° and the load carrying structure 40 is now supported on the ground by both its front and rear ground engaging supports 44. At this point the cable 36 can be disconnected from the load carrying structure 40 and the empty transport apparatus 10 moved away from the load carrying structure 40.

When it is desired to pick up the load carrying structure 40 from its fully ground bearing or supported position, the empty transport apparatus 10 is backed up to the load carrying structure 40 to the positions as shown in FIG. 7 at which the forward most anti-friction devices 42 of the load carrying structure 40 are in engagement with the longitudinal guide surfaces 22 of the tiltable frame element 26. When engagement of the forward most anti-friction devices 42 with the longitudinal guide surfaces 22 has been achieved the winch 24 is activated in the direction to wind in the cable 36 and begin rolling the load carrying structure 40 up the inclined longitudinal guide surfaces 22. The sequence of events shown in FIGS. 2-7 is reversed until the tiltable frame element 26 is in its horizontal or fully lowered position and the load carrying structure 40 is in its home or fully forward position. When the load carrying structure 40 has been rolled up to about the position shown in FIG. 4 the tiltable frame element 26 can be lowered to its horizontal position and the load carrying structure 40 pulled by winch 24 to its full forward position. At the full forward position the gravity pins 39 are inserted to lock the load carrying structure 40 in place on the tiltable frame element 26.

Referring now to FIG. 8 which shows the load carrying structure 40 isolated and at a larger scale. The forward most anti-friction devices 42 are constructed of cast iron or steel wheels such that there is no cushion or compression between the load carrying structure 40 and the longitudinal guide surfaces 22. This minimizes the frictional resistance between the forward most anti-friction devices 42 and the longitudinal guide surfaces 22. However, the rear most anti-friction devices 42 and those between the forward most and rear most have rubber surfaces and have a slightly larger diameter than the forward most ground engaging supports. As a result when the tiltable frame element 26 is in its horizontal or transport position the load carrying structure 40 is supported on the longitudinal guide surfaces 22 by the larger cushioned anti-friction devices 42. This not only cushions the ride when in the transport position but also results in a much quieter ride.

Figure 9:
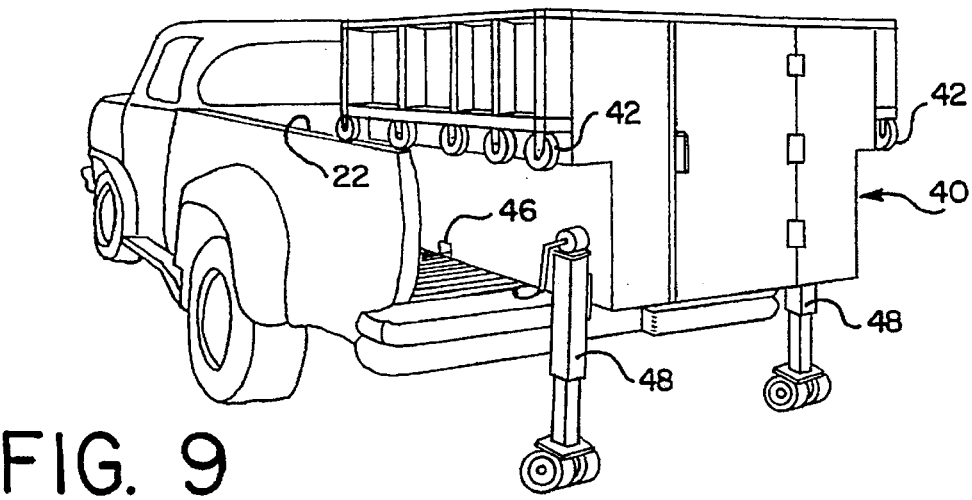
FIG. 9 is a view of a roll on roll off mechanism that utilizes portable jacks or supports, to support the load carrying structure at a location spaced above the ground, that can be used with the transport apparatus disclosed herein.
Figure 10:
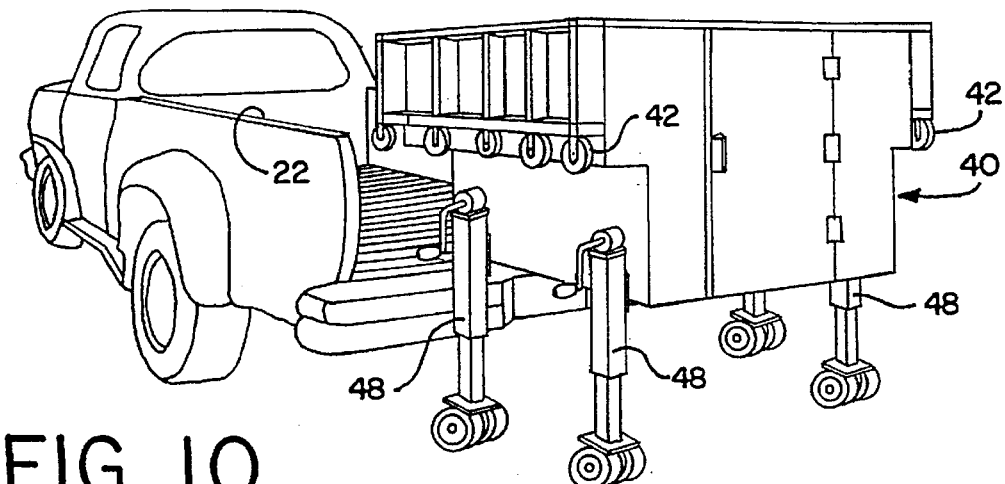
FIG. 10 is another view of the roll on roll off mechanism seen in FIG. 9.

Also disclosed in FIG. 8 are sockets 46 which can be used in cooperation with portable jacks to store the load carrying structure 40 at a level above the ground. A detailed disclosure of a system of this type is disclosed in my above identified co-pending application Ser. No. 08/200,958. FIGS. 9 and 10 are Figures taken from my co-pending application Ser. No. 08/200,958 minus the reference numbers from that application. FIG. 9 corresponds to FIG. 3 after the tiltable frame element 26 has been returned to its horizontal or lower most position. Portable jacks 48 of the type shown in FIGS. 9 and 10 are secured to the load carrying structure 40 through sockets 46 to thus store the load carrying structure 40 at a position elevated from the ground.

FIGS. 9 and 10 are illustrations of another embodiment of the applicant's invention. In the illustrations of this embodiment the transport vehicle is shown as a pick up truck however the invention could be used with any type of vehicle or transport device. For example the transport vehicle could be a small trailer, a large trailer pulled by highway tractor, a flat bed truck, a small or large van, a train, a ship, a barge or an airplane. As seen in FIGS. 9 and 10 the container 40 includes two sets of rollers 42 that are secured to horizontal bottom support surfaces such that they are horizontal to each other. The transport vehicle includes a pair of elongated flat support surfaces 22 that extend horizontal to the ground and parallel to each other. The flat support surfaces 22 are unencumbered from above and are located on the transport vehicle such that they function to support the container 40 through the rollers 42. The container 40 is supported on the transport vehicle at a fixed elevation above the ground such that the bottom surface of the container is spaced from and not in contact with the bottom surface of the transport vehicle. The sets of rollers 42 and the flat support surfaces 22 function as cooperating anti-friction mechanisms that will permit the container 40 to be rolled on and off the transport vehicle with little effort. The transport vehicle and container 40 include cooperating anchor devices that function to secure the container 40 in place on the transport vehicle. Anchoring devices such as gravity pins 39 as shown in FIG. 1 could be used for this purpose.

In this embodiment independent support 48 for the container 40 are transported with the container and transport vehicle. It is important that the portable independent support is capable of supporting the container at the same elevation above the ground as it will be or was supported on the transport vehicle so as to insure a smooth relative movement therebetween. In this respect it should be noted that if multiple transport vehicles are used their support surfaces may not be located at equal elevations above the ground. For this reason the independent supports 48 used in this embodiment are in the form of jacks that can be adjusted to support the container at a selected elevation above the ground.

As seen in FIG. 9 sockets 46 are provided near the bottom of the container 40 for receiving the jacks 48.

In FIG. 10 the transport vehicle has been driven forward or the container 40 has been rolled rearwardly to complete the transfer of the container from the transport vehicle to the jacks 48.

Figure 11:
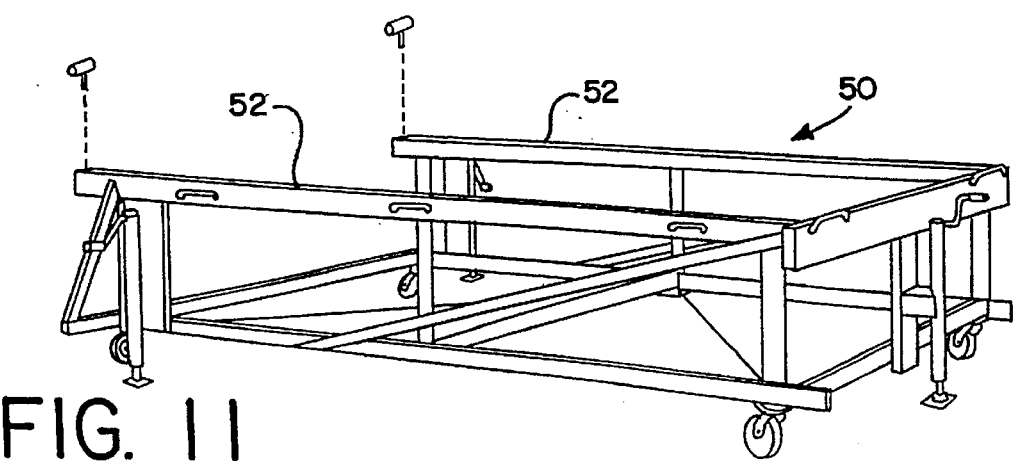
FIG. 11 shows a receiver, that can be permanent or portable, that can be used with the transport apparatus disclosed herein.

The transport apparatus 10 disclosed herein also has the versatility of using stationary storage platforms of the type disclosed in my above identified co-pending patent application Ser. No. 08/001,960. FIG. 11 is a Figure that has been reproduced, without the old reference numbers, from application Ser. No. 08/001,960. Platforms of the type 50 disclosed in FIG. 11, are provided at the regular pick up and delivery locations. A load carrying structure 40 can be loaded from a platform 50 to a tiltable frame element 26, that is horizontal, by sliding it horizontally along the elongated flat support surfaces 52 on to the longitudinal guide surfaces 22 of the horizontal tiltable frame element 26. When the transport vehicle has spring loaded axles, as would be expected in the pick up truck disclosed in FIGS. 9 and 10, the longitudinal guide surfaces 22 would begin to lower as weight is transferred to the transport vehicle. This can be accommodated for by adjusting the jacks located at the front of the platform 50. The sliding operation is reversed when it is desired to unload a load carrying structure 40 from a horizontal tiltable frame element 26 to a platform 50. The opposite is also true when unloading a heavy loaded container 40, of the type seen in FIG. 9 to a stationary platform 50 of the type seen is FIG. 11. When such an operation is accomplished the guided surfaces 22 will raise up as weight is removed from the transport vehicle. When this occurs the jacks on the front of platform 50 must be expanded to insure that the surfaces 22 and 52 remain on the same plane.

Loading and unloading from a platform 50, of the type illustrated in FIG. 11, is a much simpler and faster procedure that loading and unloading from the ground. Thus, this is a valuable and useful option that is available with the transport apparatus of this invention.

Figure 14:
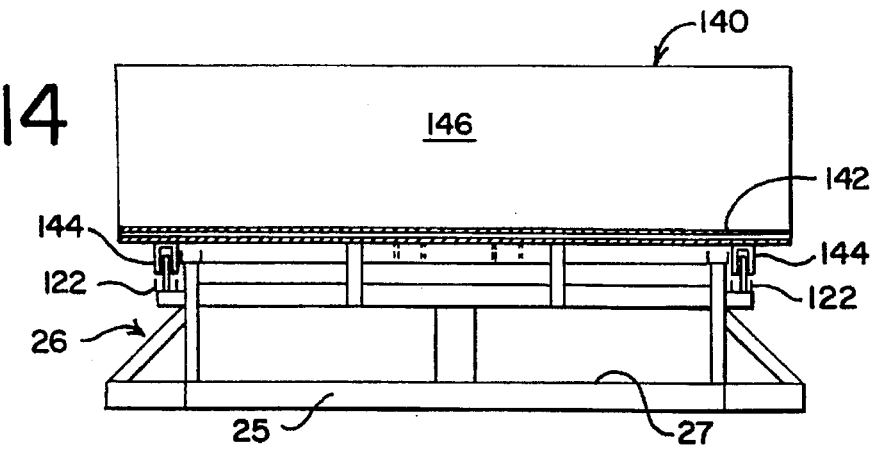
FIG. 14 is an isolated rear view of the tiltable frame element with another embodiment of the load carrying structure supported thereon.

Referring now to FIG. 14 wherein another embodiment of the load carrying structure is disclosed. The load carrying structure 140 seen in this Figure is a flat bed carrier having a flat bottom surface 142 and a front vertical wall 146. It should be noted that this embodiment the anti-friction devices 144 ride in the second set of longitudinal guide surfaces 122 rather than the guide surfaces 22. This lowers the center of gravity of the loaded load carrying structure 140 and stabilizes the transport apparatus 10.

Figure 15:
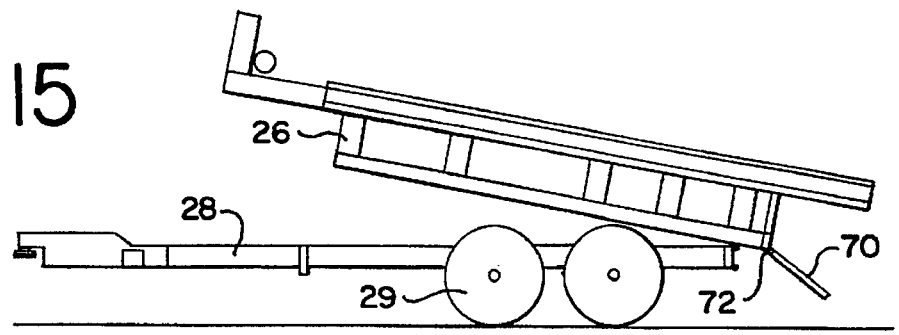
FIG. 15 is side view of the embodiment of the invention seen in FIG. 1 without a load carrying structure.

FIG. 15 is a side view of the embodiment of the invention seen in FIG. 1 without the load carrying structure 40. When the load carrying structure 40 is removed from the transport apparatus 10 the tiltable frame element 26 can function as a dump trailer. The tiltable frame element 26 has a solid bottom, front and side walls. All that needs to be added to this structure is a tail gate 70 that can for example be hinged 72 along its bottom edge.

It is intended that the accompanying drawings and the foregoing detailed description is to be considered in all respects as illustrative and not restrictive, the scope of the invention is intended to embrace any equivalents, alternatives, and/or modifications of elements that fall within the spirit and scope of the invention, and all changes which come within the meaning and range of equivalency of the claims are therefore intended to be embraced therein.

What is claimed is:

1. A method of loading a load carrying structure onto a tiltable frame comprising the steps of:

(a) providing a ground-wheel supported chassis;

(b) pivotally mounting a tiltable frame element on said ground wheel support chassis, said tiltable frame element having a base, front and rear end portions and longitudinal side portions;

(c) tilting said tiltable frame element relative to said ground-wheel support chassis such that the rear end portion of said tiltable frame element moves toward the ground and the front end portion of said tiltable frame element moves away from the ground;

(d) locating a load carrying structure, having a bottom surface and longitudinal side portions, on the ground to the rear of said ground-wheel supported chassis;

(e) providing cooperating anti-friction structures on said tiltable frame element and said load carrying structure that engage along a plane that is above the bottom surface of load carrying structure when the load carrying structure is in a horizontal attitude, said anti-friction structures being located such that they will become engaged when said load carrying structure is pulled toward said tiltable frame element and will function to facilitate relative movement between said tiltable frame element and said load carrying structure with a free space between said bottom surface and the base of said tiltable frame element.

2. The method as set forth in claim 1 wherein the following additional steps are performed:

(f) providing a winch having a cable connected thereto on the front end portion of said tiltable frame element, said cable having a free end;

(g) connecting the free end of the cable to said load carrying structure; and (h) actuating said winch such that said load carrying structure is pulled toward said inclined tiltable frame element until the cooperating antifriction structures are engaged and upon further pulling by the winch the load carrying structure is pulled up the inclined tiltable frame element.

3. The method as set forth in claim 2 in which the following additional steps are performed:

(i) lowering the tiltable frame element from the inclined position to a horizontal position; and (j) actuating the winch to cause the load carrying structure to be pulled to a home position.

4. The method as set forth in claim 3 in which the following additional steps are performed:

(k) engaging a locking device to secure the load carrying structure in the home position relative to said inclined tiltable frame.

5. The method as set forth in claim 1 in which the following additional steps are performed:

(f) providing said tiltable frame element with longitudinal guide surfaces along each of its longitudinal side portions, said longitudinal guide surfaces being elevated from the base a given distance and function as the cooperating anti-friction structure for the tiltable frame element, and (g) providing said load carrying structure with a set of aligned rollers on its longitudinal side portions, said set of aligned rollers define engagement surfaces that are elevated from the bottom surface of said load carrying structure a distance less than said given distance.

6. The method as set forth in claim 5 wherein the following additional steps are performed:

(f) providing a winch having a cable connected thereto on the front end portion of said tiltable frame element, said cable having a free end;

(g) connecting the free end of the cable to said load carrying structure; and (h) actuating said winch such that said load carrying structure is pulled toward said inclined tiltable frame element until the cooperating antifriction structures are engaged and upon further pulling by the winch the load carrying structure is pulled up the inclined tiltable frame element.

7. The method as set forth in claim 6 in which the following additional steps are performed:

(i) lowering the tiltable frame element from the inclined position to a horizontal position; and (j) actuating the winch to cause the load carrying structure to be pulled to a home position.

8. The method as set forth in claim 7 in which the following additional step is performed:

(k) engaging a locking device to secure the load carrying structure in the home position relative to said inclined tiltable frame.

* * * * *